United States Patent [19]

Klingel et al.

[11] Patent Number: 5,667,707
[45] Date of Patent: Sep. 16, 1997

[54] LASER CUTTING MACHINE WITH FOCUS MAINTAINING BEAM DELIVERY

[75] Inventors: Hans Klingel, Möglingen; Juergen Michael Weick, Asperg, both of Germany

[73] Assignee: Trumpf GmbH & Co., Ditzingen, Germany

[21] Appl. No.: 433,898

[22] Filed: May 2, 1995

[30] Foreign Application Priority Data

May 2, 1994 [DE] Germany .................. 94 07 288.4 U

[51] Int. Cl.⁶ .................................................. B23K 26/04
[52] U.S. Cl. .......................... 219/121.67; 219/121.74; 219/121.78
[58] Field of Search ................ 219/121.67, 121.73, 219/121.74, 121.75, 121.78, 121.79, 121.8, 121.81, 121.84; 364/474.08; 359/845, 846, 847; 137/625.28, 599

[56] References Cited

U.S. PATENT DOCUMENTS

| 5,298,716 | 3/1994 | Ogawa et al. | 219/121.67 |
| 5,329,965 | 7/1994 | Gordon | 137/599 |
| 5,399,835 | 3/1995 | Nakata | 219/121.78 |
| 5,493,095 | 2/1996 | Bruschi et al. | 219/121.75 |

FOREIGN PATENT DOCUMENTS

| 57-6804 | 1/1982 | Japan | 359/847 |
| 63-242484 | 10/1988 | Japan | 219/121.75 |
| 1-166894 | 6/1989 | Japan | 219/121.75 |
| 2-280987 | 11/1990 | Japan | 219/121.73 |
| 3-128187 | 5/1991 | Japan | 219/121.67 |
| 3-174995 | 7/1991 | Japan | 219/121.74 |
| 4-327394 | 11/1992 | Japan | 219/121.78 |
| 6-47575 | 2/1994 | Japan | 219/121.8 |

Primary Examiner—Teresa J. Walberg
Assistant Examiner—Gregory L. Mills
Attorney, Agent, or Firm—Pepe & Hazard

[57] ABSTRACT

On laser cutting machines the laser cutting head is movable relative to the laser generator, respectively relative to the workpiece to be cut, in a plane parallel to the workpiece by means of a drive controlled by a numerical control. The laser cutting head also has an adjusting device for adjusting the focal position of the laser beam, by means of which the focus can be shifted with respect to the laser cutting head perpendicular to the workpiece. The position of the laser beam focus perpendicular to the workpiece influences the cutting quality obtained, respectively the resulting cutting characteristics. A laser cutting machine which is functionally efficient under workshop conditions and suitable for automatic operation, for which a sure optical adjustment of the focal position is possible, has not been available up to now. The new laser cutting machine should eliminate this problem. For this purpose on a laser cutting machine of the type described above, the numerical control for maintaining a constant focal position perpendicular to the workpiece also controls the adjusting device for adjusting the focal position, depending on the position of the laser cutting head in its plane of motion parallel to the workpiece.

5 Claims, 5 Drawing Sheets

LASER CUTTING MACHINE WITH FOCUS MAINTAINING BEAM DELIVERY

BACKGROUND OF THE INVENTION

The invention concerns a laser cutting machine with a laser generator as well as with a laser cutting head, which can be moved relative to the laser generator and/or relative to a workpiece in a plane essentially parallel to the workpiece by means of a drive controlled by a numerical control and has a focussing lens for the laser beam as well as an adjusting device for adjusting the focal position of the laser beam by shifting the focus with respect to the laser cutting head essentially perpendicularly to the workpiece.

On laser cutting machines with a so-called "flying lens," the laser cutting head with the focussing lens for the laser beam is moved relative to the workpiece which is fixed in place during cutting; because of the constantly changing position of the laser cutting head, the laser beam has to cover constantly changing path lengths from the laser generator to the focussing lens on the laser cutting head. Among other things, the laser beam path length is decisive for the position of the laser beam focus created by means of the focussing lens which direct the beam perpendicularly to the workpiece to be cut. However, in order to be able to ensure a uniform cutting quality, respectively uniform cutting data characteristics, during the entire working process, it must be made sure that the focal position also does not change, or at most barely changes, even in the case of a change in the position of the laser cutting head and the change in the laser beam path length.

The entire laser cutting head is raised or lowered in laser cutting machines in the known way in relation to the laser beam length in order to obtain an unchanging focal length perpendicular to the workpiece over the entire range of motion of the laser cutting head parallel to the workpiece to be cut. The position of the focus in this case remains unchanged relative to the laser cutting head.

An adjusting device for the optical adjustment of the focal position of the beam, developed for a generic laser cutting machine, is in the form of adaptive spherical surface mirrors for the laser beam, which are arranged ahead of the focussing lens of the laser cutting head in the direction of passage of the laser beam. This serves for adjusting the focal position by shifting the focus with respect to the laser cutting head. The curvature of the mirror surfaces, and thus their focal length, can be varied by having changing pressures act upon the surfaces of the surface mirrors opposite the reflecting surfaces. A change in the divergence or convergence, of the laser beam, which is reflected from the surface mirror arranged directly ahead of the focussing lens onto the latter, results from a change in the mirror curvature. Now if the laser beam geometry changes as a result of a position change of the laser cutting head and a change in the beam path length connected with this, then this change in geometry can be compensated by varying the mirror curvature. As a consequence of this, the position of the focus created by the focussing lens perpendicular to the workpiece remains unchanged and independent of the length of the laser beam path.

In the known test arrangement only the described general functional principle for optical adjustment of the focal position of the laser beam is realized by means of adaptive mirrors.

The task of the invention now is to prepare a laser cutting machine, capable of functioning under workshop conditions and suited for automatic operation, which permits a functionally sure optical adjustment of the focus position.

SUMMARY OF THE INVENTION

This task is solved in accordance with the invention by the fact that, in the case of a cutting machine of the type mentioned initially, the numerical control for maintaining a constant focal length perpendicular to the workpiece also controls the adjusting device for adjusting the focal length in relation to the position of the laser cutting head in the plane of motion thereof parallel to the workpiece. Then the position of the laser cutting head is recorded representatively for the length of the laser beam by means of the numerical control. A specific adjustment of the adjusting device for varying the focal position is associated with each position of the laser cutting head and thus each laser beam path length. Controlled by the numerical control, the adjusting device is put into the appropriate nominal adjustment.

Basically it is possible to set the device for adjusting the focal length continuously by means of the numerical control and to assign a specific adjustment of the adjusting device to each point-local position of the laser cutting head. However, in order to simplify the control, in a preferred embodiment of the laser cutting machine in accordance with the invention, it is provided that the laser cutting head is movable within a range of motion subdivided into at least two sub-ranges and that an adjusting value for adjusting a constant focal position is associated with each sub-range. It is advisable to choose the number of the sub-ranges in relation to the size of the surface which is to be swept with the laser cutting head during the working process. On the basis of the adjusting value predetermined for each sub-range, the numerical control controls the adjustment of the adjusting device for the focal position. An adjustment of the adjusting device always is required when the laser cutting head changes from one sub-range of its range of motion to a sub-range adjacent to this.

In a further embodiment of the invention, in the case of which the adjusting device for adjusting the focal length has at least one surface mirror arranged ahead of the focussing lens of the laser cutting head in the direction of the laser beam, the surface opposite its mirror surface is acted upon by a fluid which is under variable pressure and thus is curved adaptively. In this embodiment a fluid acts upon the surface mirror via an adjustable flow control arrangement, by means of which the pressure of the fluid is variable and that the numerical control of the registered position of the laser cutting head is associated with a nominal value for the pressure of the fluid as an adjusting value for adjusting the focal position and controls the adjustable flow control arrangement for the adjustment of this nominal value. The fluid pressure occurring on the output side of the flow control is regulated by regulating the cross-section of the passage of the adjustable flow control arrangement. Correspondingly variable pressures can be exerted on the mirror surface of the surface mirror located downstream of the flow control arrangement and thus change its curvature. The convergence, respectively the divergence, of the laser beam reflected by the surface mirror onto the focussing lens and from the latter onto the workpiece is dependent on the curvature of the mirror surface. As a result of this a change in the fluid pressure occurring on the output side of the adjustable flow control arrangement and acting on the back side of the mirror surface of the surface mirror leads to a change in the focussing relations on the focussing lens and thus to an adjustment of the focal position of the laser beam perpendicular to the workpiece. The adjusting device for optical adjustment of the focal position is controlled by means of the numerical control via the adjusting value in such a way that a uniform focal position is adjusted over the entire range of motion of the laser cutting head in the plane of motion thereof parallel to the workpiece to be cut with respect to the latter.

In the case of one embodiment of the laser cutting machine in accordance with the invention, in the case of which the range of motion of the laser cutting head is subdivided into subranges, it is advisable that a corresponding nominal value for the pressure of the fluid be associated with the sub-ranges with the approximately corresponding length of the laser beam path from the laser generator to the laser cutting head and that a parallel circuit of flow control valves is provided as a flow control arrangement, the number of which flow control valves corresponds to the number of different nominal values for the pressure of the fluid. Depending on the position of the sub-range, within which the laser cutting head is moving at the moment, the numerical control controls the individual flow control valves of the flow control arrangement on the basis of the adjusting value associated with the sub-ranged concerned. If the laser cutting head changes from one sub-range of its range of motion to another, the number of the flow control valves switched into the opening position is changed. The cross-section of the passage of the flow control arrangement and thus the pressure of the fluid occurring on the output side thereof and determining the curvature of the mirror surface of the surface mirror is adjusted to the desired value by switching on, respectively by closing one or more of the flow control valves connected in parallel.

If fluid permanently flows through one of the flow control valves connected in parallel, a sufficient cooling of the mirror surface of the surface mirror always is guaranteed in the case of using a suitable fluid as a coolant. Advisably the pressure of the fluid, which is adjusted at the output side of the flow control arrangement, when the other flow control valves of the flow control arrangement are switched to the closed position, and fluid only flows through the permanently opened flow control valve, corresponds to a nominal pressure value associated with a sub-range of the laser cutting head motion.

In a further advantageous configuration of the invention, it is provided that in the case of a laser cutting machine of the type named initially, the focussing lens on the laser cutting head is guided movable essentially perpendicular to the workpiece by means of an adjusting motor. A laser cutting machine of this type is distinguished by a sure optical adjustment of the focal position. A change in the focal position as a result of a position change of the laser cutting head and a change in the laser beam length connected with it can be avoided by shifting the focussing lens. The housing of the laser cutting head with the components provided on it, such as perhaps the nozzle for feeding cutting gas into the cutting track of the laser beam, can maintain its distance from the workpiece once set during the entire cutting process. The mass to be moved in the case of adjusting the focal position is correspondingly minimal: the constant distance of the nozzle from the workpiece together with the constant focal position over the entire range of motion of the laser cutting head guarantees a uniform cutting quality.

An automatic operation of the machine with an optimization of the working time is made possible by having the focussing lens movable by means of an adjusting motor controlled by the numerical control. A fine adjustment of the focussing lens is ensured by choosing correspondingly precisely finely adjustable adjusting motors.

An electric stepping motor is provided in the case of a preferred embodiment of the laser cutting machine in accordance with the invention. Alternatively a piston-cylinder arrangement is recommended as the adjusting motor.

As a further measure for sure optical adjustment of the focal position in a generic laser cutting machine in accordance with the invention, it is provided that the adjusting device for adjusting the focal position has at least one lens system with adjustable focal length arranged ahead of the focussing lens in the direction of the laser beam. The convergence, respectively divergence, of the laser beam striking the focussing lens is influenced by the adjustment of the focal length of the lens system mentioned as well as by the adaptive mirrors.

Advantageously the lens system has at least one collecting lens and at least one dispersing lens, which are arranged one after the other in the direction of the laser beam and are movable relative to one another for adjusting the focal length. In this embodiment of the laser cutting machine in accordance with the invention, the focal length of the lens system and thus the convergence, respectively divergence, of the laser beam striking the lens system can be varied by means of a simply controllable motion, namely by means of a linear relative movement of collecting lens and dispersing lens in the axial direction of the laser beam. An automated time-optimized operation of a laser cutting machine of this type is assured when the focal width of the lens system is controlled by the numerical control.

The focal position is adjusted by means of the numerical control of the laser cutting machine according to the principle which was explained above for laser cutting machines with adaptive surface mirrors in accordance with the invention, both in the case of using a movable focussing lens as well as in the case of using a lens system arranged ahead of the focussing lens and variable in its focal length.

BRIEF DESCRIPTION OF THE DRAWINGS

The invention is explained in greater detail below by means of schematic representations of a specific embodiment.

DETAILED DESCRIPTION OF THE PREFERRED EMBODIMENT

Figure 1:
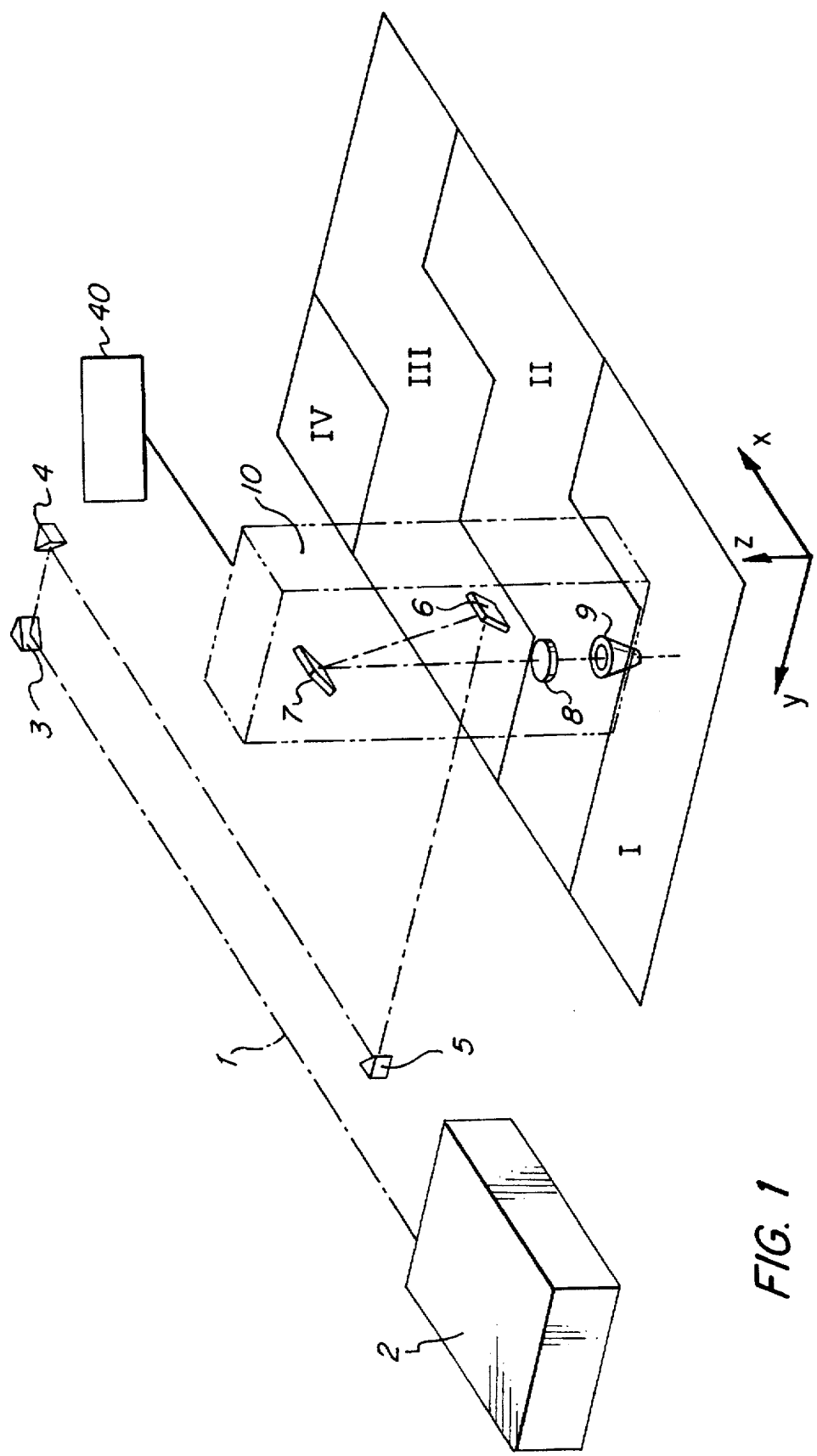
FIG. 1 shows a schematic representation of the guiding of the laser beam on a laser cutting machine with adaptive surface mirror for the laser beam.

As is shown in FIG. 1, in laser cutting machines a laser beam 1 emanating from a laser generator 2 is guided via surface mirrors 3, 4, 5, 6, and 7 to a focussing lens made as a collecting lens 8. The collecting lens 8 focusses the laser beam 1 through a nozzle 9 onto a workpiece not shown. The nozzle 9 serves for delivering cutting gas into the cutting track of the laser beam 1. The surface mirror is an adaptive mirror with variable curvature.

The laser generator 2 as well as the surface mirrors 3 and 4 are installed fixed in place on the machine frame of the laser cutting machine. A laser cutting head 10, on the outside of which the surface mirror 6 is mounted and which holds the surface mirror 7 as well as the collecting lens 8 and the nozzle 9, is guided and movable on the machine frame by the drive system generally designated by the numeral 40. The laser cutting head 10 has a triaxial range of motion. In a horizontal plane it is movable in the direction of an x-axis as well as a y-axis. In addition, the laser cutting head 10 can be raised and lowered in the direction of a z-axis. Under the laser cutting head (10) the range of motion thereof is subdivided into four sub-ranges as indicated by the numerals I, II, III, IV.

FIG. 1 shows that a change in the position of the laser cutting head 10 is connected with a change in the path length which the laser beam has to cover from the laser generator 2 to the collecting lens 8. A change in the position of the focus, to which the collecting lens 8 focusses the laser beam 1, in a direction perpendicular to the workpiece not shown, is connected with a change in the length of the laser beam 1. However, a change in the focal position of this type during the cutting process causes changes in the cutting quality, respectively the cutting data.

In order to standardize the focal position, it is conceivable to shift the laser cutting head 10 in the direction of the z-axis depending on the length of the laser beam 1. The focal point, the distance of which from the collecting lens 8 remains unchanged, can be raised or lowered by moving the laser cutting head 10 in the z-direction depending on the requirements and in this way can be held at a uniform spacing with respect to the workpiece. If the laser, cutting head 10 is raised or lowered, the nozzle 9 moves with it, so that the distance between the lower edge of the nozzle and the upper surface of the workpiece changes frequently during the cutting process. However, this distance has to be held exactly constant as to the focal position in order to obtain similar cutting conditions over the entire operating range. A constant distance between nozzle and workpiece is ensured in the case of the arrangements for focal position adjustment shown in FIGS. 2, 5a, 5b, and 6. Namely, these arrangements make it possible to guide the laser cutting head 10 with a constant distance in the direction of the z-axis over the workpiece to be cut.

The arrangement in accordance with FIG. 1 uses the adaptive mirror 7 for this purpose. The adaptive mirror 7 has a polished mirror surface 12, which is formed by the surface of a thin metal disk. The edges of this thin metal disk are clamped into the holding ring of a mirror housing 13. The incident laser beam 1 is reflected from the mirror surface 12 to a collecting lens 8, which focusses the laser beam 1 onto the surface of the workpiece.

Water under pressure acts upon the metal disk of the mirror on the surface turned away from the mirror surface 12 via a fluid line 14. Since the metal disk of the mirror shown 7 has been made planar or flat with a pressure of 1.25 bar, a planar shape of the mirror surface results when water under a pressure of 1.25 bar occurs in the fluid line 14. If the pressure in the fluid line 14 drops below this value, the mirror surface 12 assumes a concave shape, as is shown in the right-hand part of FIG. 2. Correspondingly an increase in the pressure in the fluid line 14 over 1.25 bar leads to a convex deformation of the mirror surface 12. The degree of the convexity or concavity, of the mirror surface 12 can be adjusted by controlling the pressure in the fluid line 14. As may be seen in comparing the left-hand and right-hand parts of FIG. 2, a change in the curvature of the mirror surface 12 leads to a change in the convergence or, divergence, of the laser beam 1 reflected from the mirror surface 12. The position of the focus of the laser beam 1 perpendicular to the workpiece varies depending on the adjusted geometry of the laser beam 1.

Figure 3:
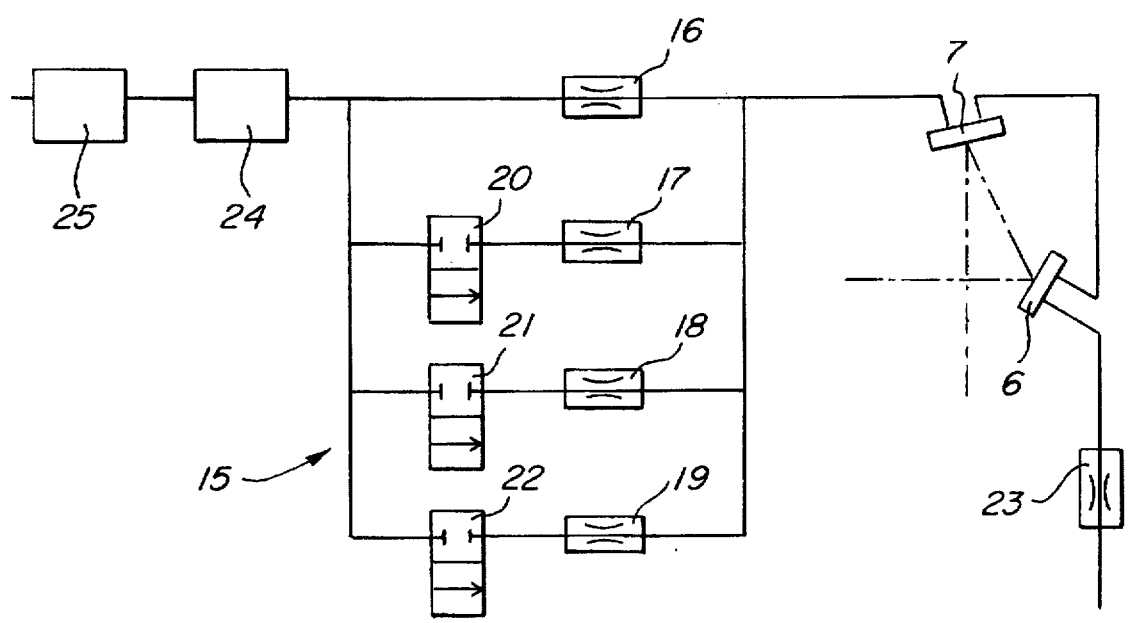
FIG. 3 shows the pressure supply for the adaptive mirror in accordance with FIG. 2.

The pressure occurring in the fluid line 14 is adjusted by means of the numerical control in the laser cutting machine. This is connected with a flow control arrangement 15, as is shown in FIG. 3. The flow control arrangement 15 is arranged in front of the adaptive mirror 7 in the direction of flow of the water under pressure and includes four flow control valves 16, 17, 18, 19 connected in parallel. Water under pressure permanently flows through the flow control valve 16. The flow of water under pressure through the flow control valves 17, 18, 19 can be blocked, respectively released, by controllable magnetic valves 20, 21, 22. A fixed flow control 23 is provided in the return of the pressure water; a pressure regulator 24 and a superfine filter 25 are arranged ahead of the flow control arrangement 15.

The water under pressure supplied by a pressure source is fed to the flow control arrangement 15 via the superfine filter 25 and the pressure regulator 24. A maximum system pressure is provided by means of the pressure regulator 24. Since the fixed flow control 23 has an invariable cross-section of the passage and consequently builds up a constant pressure head, the pressure occurring in the fluid line 14 of the adaptive mirror 7 can be adjusted by controlling the flow control arrangement 15. Since water under pressure permanently flows through the flow control valve 16, the adaptive mirror 7, as well as the surface mirror 6 connected at the outlet side, always is provide with a certain amount of pressure water functioning as coolant. In the case of the embodiment shown, with the magnetic valves 20, 21, and 22 closed, a pressure of 0.5 bar occurs at the output side of the flow control arrangement and thus also on the rear side of the mirror surface 12 of the adaptive mirror 11.

Figure 4:
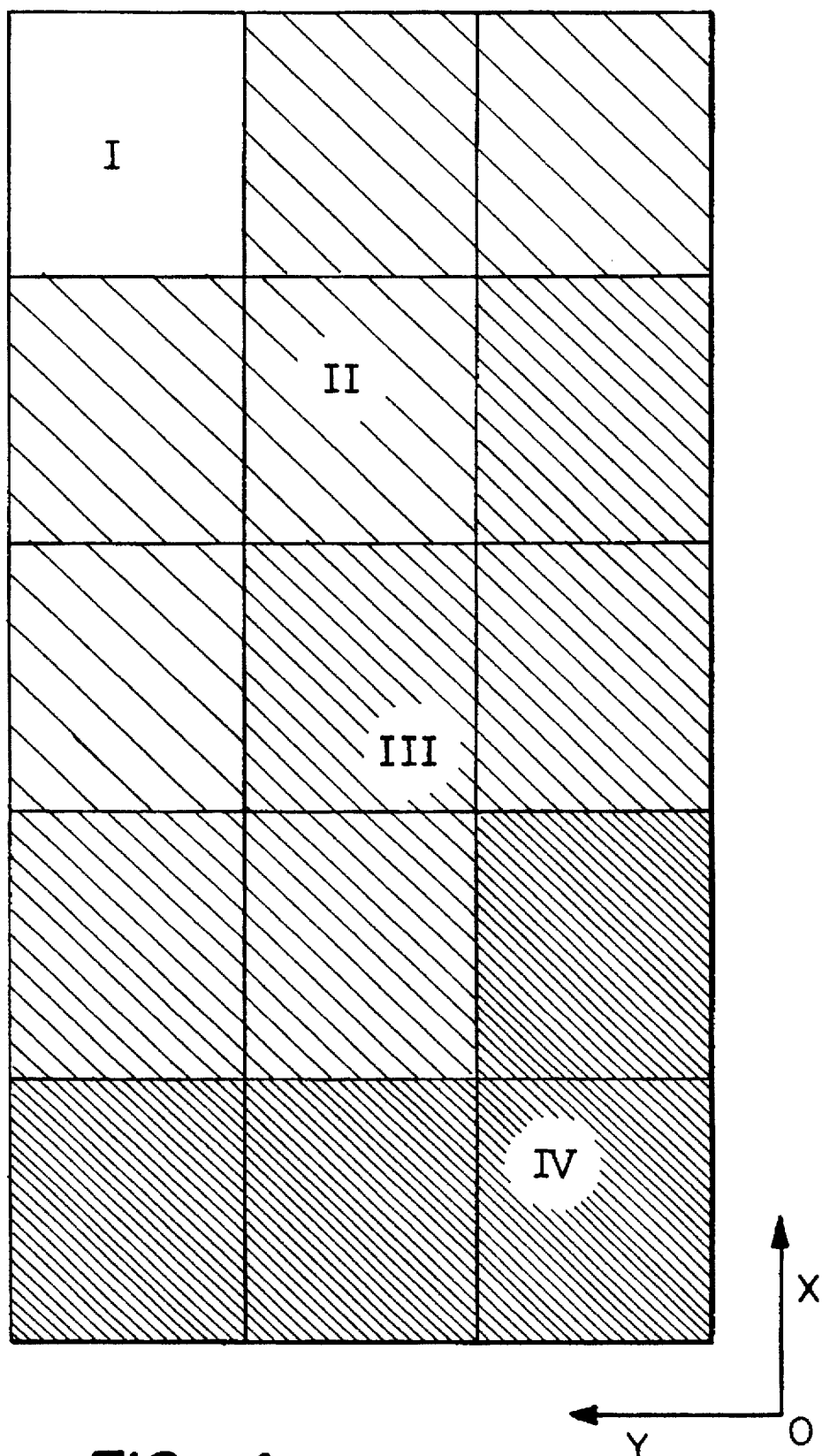
FIG. 4 shows the range of motion of a laser cutting head subdivided into sub-ranges.

As FIG. 4 shows, a range of motion swept by the laser cutting head concerned is subdivided into a total of fifteen fields in the horizontal x-y plane. In this case the fields cross-hatched in the same way for sub-regions I, II, III, and IV of the range of motion of the laser cutting head, within which the length of the laser beam from the laser generator to the laser cutting head varies only slightly during the motion of the laser cutting head parallel to the workpiece. Correspondingly a position change of the laser cutting head within the sub-regions I, II, III, and IV in each case does not lead to a significant change in the focal position of the laser beam perpendicular to the workpiece. Of course an adjustment of the laser beam is offered when the laser cutting head changes from one sub-region into a sub-region adjacent to this. Then, of course, the change in the length of the laser beam assumes a value which would lead to a change in the position of the focus relative to the laser cutting head relevant for the cutting result. In the case of the transition of the laser cutting head from one of the sub-regions I, II, III, IV into another, correspondingly the optical arrangements for adjusting the focal position are controlled in such a way as to produce an invariable focal position with respect to the workpiece to be cut.

Figure 2:
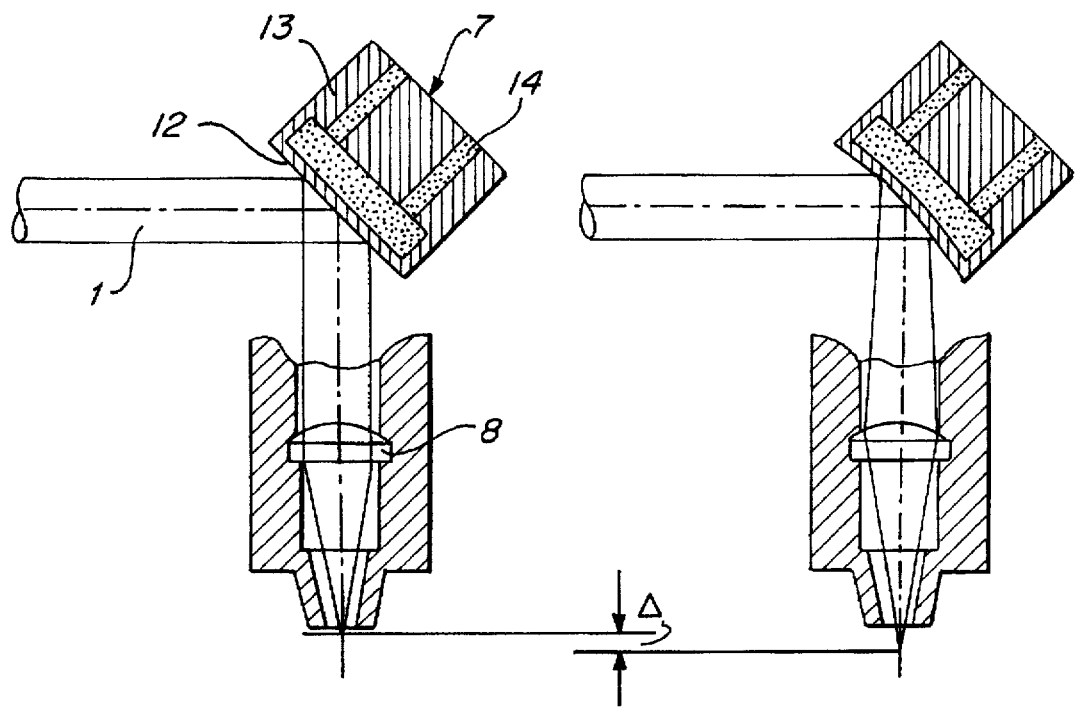
FIG. 2 shows the basic design of an arrangement for focal position adjustment by means of an adaptive mirror as shown in FIG. 1 subjected to pressure.

In the case of an arrangement in accordance with FIGS. 2 and 3, the pressure of the fluid in the fluid line 14 is regulated for this purpose. The pressure 16 set in the case of closed magnetic valves 20, 21 and 22 and opened flow control valve 16 on the output side of the flow control arrangement 15 creates a curvature of the mirror surface 12 of the adaptive mirror 7, as is associated with the sub-region I in FIG. 4. If now the laser cutting head changes the position in its horizontal plant of motion and transfers from sub-region I into sub-region II, then the magnetic valve 20 is switched into the opening position via the numerical control of the laser cutting machine. In this way pressure on the output side of the flow control arrangement 15 is increased and thus also on the rear side of the mirror surface 12 of the adaptive mirror 7. Accordingly the curvature of the mirror surface 12 changes, and the change in the geometry of the laser beam, which would result on the basis of the change in the length beam of the path, can be compensated.

As a consequence of this the indices of refraction on the collecting lens 8 remain unchanged irrespective of the change in position of the laser cutting head, and the focus of the laser beam 1 created by the collecting lens 8 retains its position unchanged with respect to the workpiece to be cut. In analogous fashion the magnetic valve 21 is switched into the opening position via the numerical control of the magnetic valve 21 as soon as the laser cutting head changes into sub-region III in accordance with FIG. 4. Finally, magnetic valve 22 is switched on when the laser cutting head is transferred into sub-region IV.

Figure 5A:
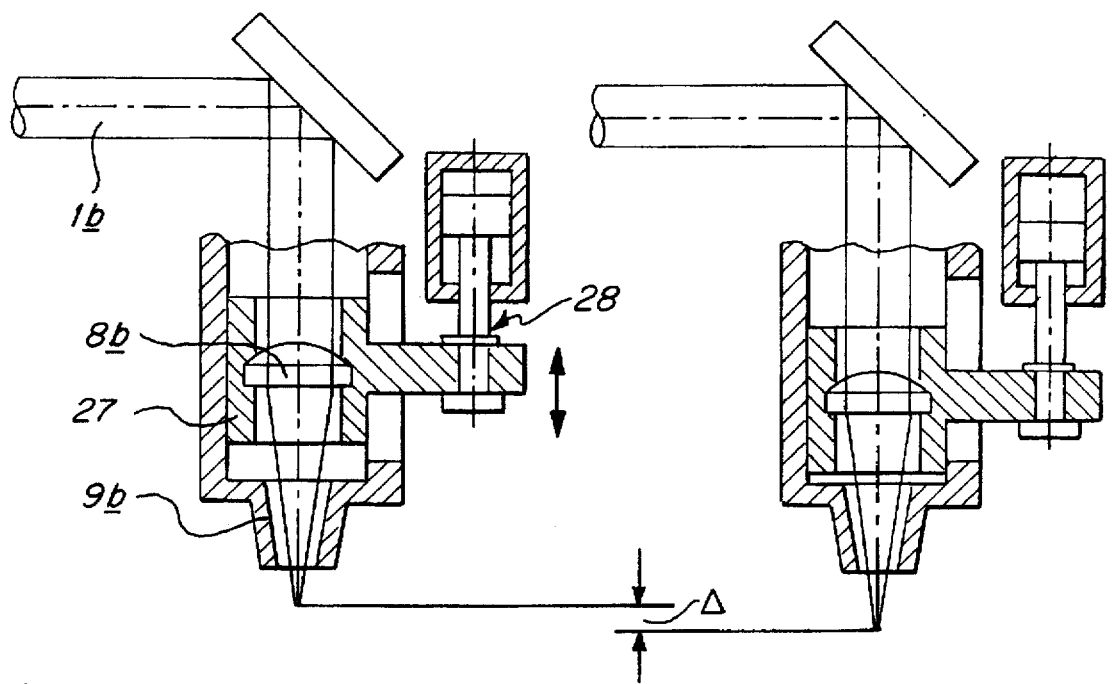
FIG. 5a shows the basic design of an arrangement for focal length adjustment by moving the focussing lens by means of a piston-cylinder arrangement.
Figure 5B:
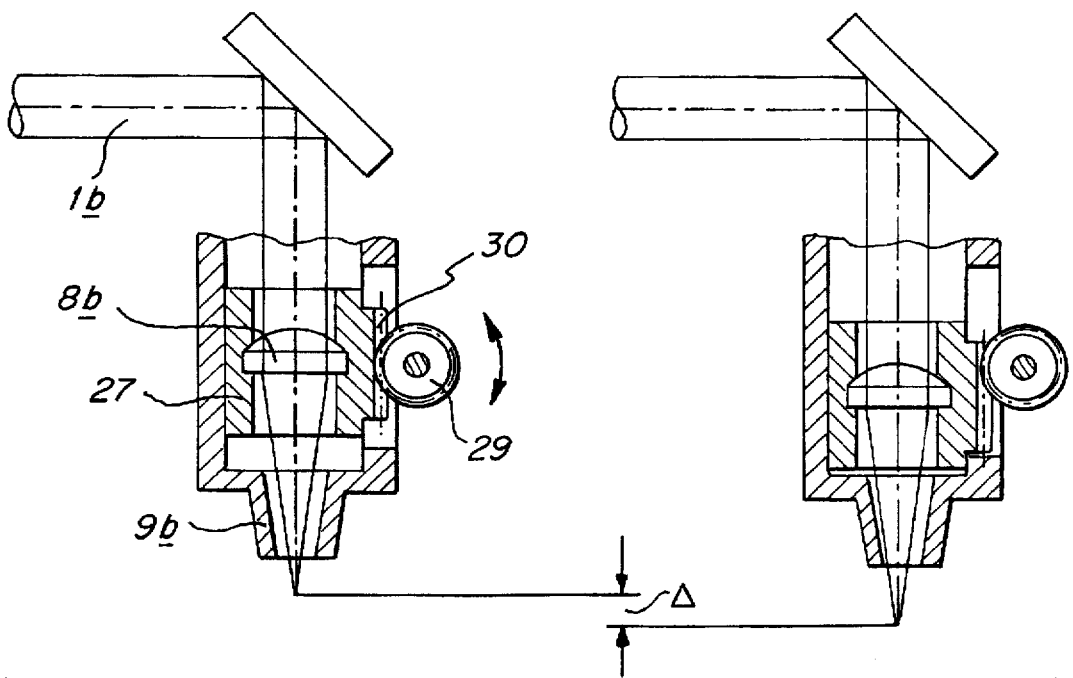
FIG. 5b shows the basic design of an arrangement for focal length adjustment by moving the focussing lens by means of an electric adjusting motor.

The arrangement shown in FIGS. 5a and 5b serves for focal position adjustment instead of an adaptive mirror of a collecting lens 8b movable perpendicular to the workpiece. The collecting lens 8b is mounted fixed on a carrier 27 and can be shifted together with this in the axial direction of a laser beam 1b perpendicular to the workpiece surface. The carrier 27 is guided movably on the laser cutting head in the given direction of motion. A nozzle 9b is permanently connected with the housing of the laser cutting head. In the case of the arrangement shown in FIG. 5a a piston-cylinder arrangement 28 serves for raising and lowering the carrier 27 with the collecting lens 8b; an electric adjusting motor, which engages with a driving pinion 29 into a gear rack 30, is used in the case of the arrangement in accordance with FIG. 5b.

If now the length of the laser beam 1b from the laser generator to the collecting lens 8b changes as a result of a change in position of the laser cutting head in its horizontal plane of motion, and also the geometry of the laser beam 1b striking the collecting lens 8b changes accordingly, then the change in the focal position resulting from this and shown in FIG. 5b can be compensated by shifting the collecting lens 8b perpendicular to the workpiece. For this purpose the numerical control of the laser cutting machine controls the piston-cylinder arrangement 28, respectively the electric adjusting motor. The carrier 27 with the collecting lens 8b is raised or lowered with respect to the workpiece by means of the piston-cylinder arrangement 28, respectively by means of the electric adjusting motor. In this way the position of the focus created by the collecting lens 8b with respect to the workpiece can be maintained.

The nozzle 9b permanently mounted on the laser cutting head cannot change its vertical position with respect to the workpiece during the compensating movement of the collecting lens 8b. A uniform cutting track nozzling over the entire horizontal range of motion of the laser cutting head can be provided in this way and manner.

The control of the piston-cylinder arrangement 28, respectively of the electric adjusting motor by means of the numerical control of the laser cutting machine can take place as int the case of the arrangement shown in FIGS. 2 and 3 by means of a sub-range adjustment of the range of motion of the laser cutting head shown in FIG. 4. A specific switch position of the piston-cylinder arrangement 28, respectively of the electric adjusting motor and thus a specific vertical distance of the collecting lens 8b from the workpiece is associated with each of the sub-ranges I, II, III, IV shown in FIG. 4.

Figure 6:
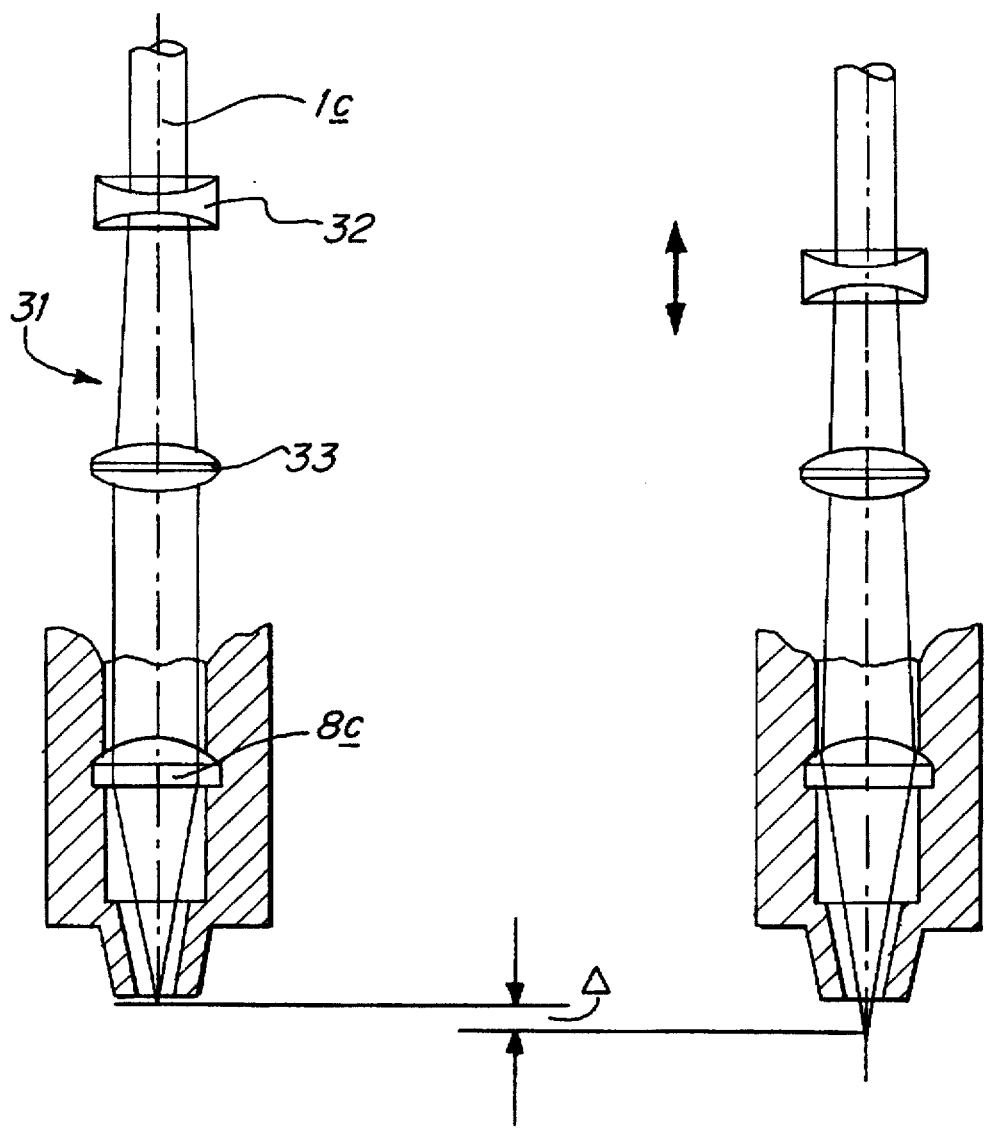
FIG. 6 shows the basic design of an arrangement for focal position adjustment by means of a lens system with adjustable focal length.

As FIG. 6 shows, the focal position perpendicular to the workpiece to be cut also can be adjusted by means of a lens system 31. The lens system 31 includes a dispersing lens 32 as well as a collecting lens 33 and is arranged ahead of the collecting lens serving as a focussing lens. The dispersing lens 32 and the collecting lens 33 are movable relative to one another in the axial direction of a laser beam 1c. A relative shift of the dispersing lens 32 and the collecting lens 33 changes the focal length of the lens system 31 and thus the geometry of the laser beam 1c striking the collecting lens 8c. The indices of refraction on the collecting lens and thus the focal position with respect to the workpiece can be rendered uniform with respect to the workpiece independent of the position of the laser cutting head in the horizontal plane of motion thereof by moving the dispersing lens 32 with respect to the collecting lens 33 controlled by means of the numerical control of the laser cutting machine in the way and manner described above. The dispersing lens 32 is adjusted by motor. As shown in FIG. 4, the range of motion of the laser cutting head is subdivided into sub-regions, with which in each case a specific nominal value for the distance between the dispersing lens 32 and the collecting lens 33 is associated.

Having thus described the invention, what is claimed is:

1. A laser cutting machine with:
   (a) a laser generator for generating a laser beam;
   (b) a laser cutting head having a nozzle with a tip;
   (c) a laser beam path from said generator to said nozzle in said cutting head;
   (d) drive means for moving said cutting head relative to said laser generator and relative to a workpiece to be cut in a plane essentially parallel to the associated workpiece to thereby vary the length of said laser beam path, said laser cutting head being movable within a range of motion relative to said laser generator;
   (e) a numerical control for said drive means;
   (f) a focussing lens for the laser beam in said cutting head; and
   (g) an adjusting device for adjusting the focal position of the laser beam relative to said nozzle tip by shitting the focus of the laser beam from said focussing lens with respect to said nozzle tip and essentially perpendicularly to the workpiece, said adjusting device for adjusting the focal position including at least one surface mirror in said cutting head prior to said focussing lens, said mirror having a reflecting surface which is variable in curvature and being mounted in a holder providing a cavity behind said mirror in which fluid may act thereon, said adjusting device including means for varying the pressure of said fluid acting on said mirror to vary the curvature of its reflecting surface and thereby the geometry of the beam reflected thereby, said numerical control being operative to determine the position of said laser cutting head relative to said laser generator and thereby the length of said laser beam path to said cutting head, said numerical control having adjusting values corresponding to said determined position for adjusting the focal position associated with the nominal value for the pressure of said fluid and controlling said pressure varying means for adjusting to this nominal value, said numerical control being operable to maintain a constant focal position of said laser beam perpendicular to the workpiece by controlling said adjusting device to adjust the geometry of said reflected beam and its focal position in relation to the position of the laser cutting head relative to said laser generator in the plane of motion parallel to the workpiece.

2. The laser cutting machine in accordance with claim 1 wherein said range of motion relative to said laser generator is divided into a multiplicity of sub-ranges and said numerical control has adjusting values for said adjusting device to provide a constant focal position associated with each sub-range.

3. The laser cutting machine in accordance with claim 1 wherein said pressure varying means includes an adjustable flow control by means of which the pressure of the fluid is variable, and wherein said numerical control varies said adjustable flow control.

4. The laser cutting machine in accordance with claim 3, wherein said range of motion of said laser cutting head relative to said laser generator is divided into a multiplicity of sub-ranges and a corresponding nominal value for the pressure of the fluid is associated with each sub-range approximating the corresponding length of said laser beam path from the laser generator to the laser cutting head and wherein a parallel circuit of flow control valves is provided as a flow control, the number of flow control valves corresponding to the number of different nominal values for the pressure of the fluid.

5. The laser cutting machine in accordance with claim 4, wherein fluid permanently flows through one of the flow control valves connected in parallel.

* * * * *

UNITED STATES PATENT AND TRADEMARK OFFICE
CERTIFICATE OF CORRECTION

PATENT NO. : 5,667,707
DATED : September 16, 1997
INVENTOR(S) : Hans Klingel et al It is certified that error appears in the above-indentified patent and that said Letters Patent is hereby corrected as shown below:

Column 8, Line 48, delete "shitting" and insert --shifting--.

Signed and Sealed this

Seventh Day of April, 1998

Attest:

BRUCE LEHMAN

*Attesting Officer*    *Commissioner of Patents and Trademarks*